WILHELM C. KROEGHER.
JOHN H. KROEGHER BEING ADMINISTRATOR OF SAID WILHELM (OR WILLIAM) C. KROEGHER, DEC'D.
VEHICLE WHEEL.
APPLICATION FILED AUG. 21, 1915. RENEWED APR. 20, 1922.
1,418,656.
Patented June 6, 1922.
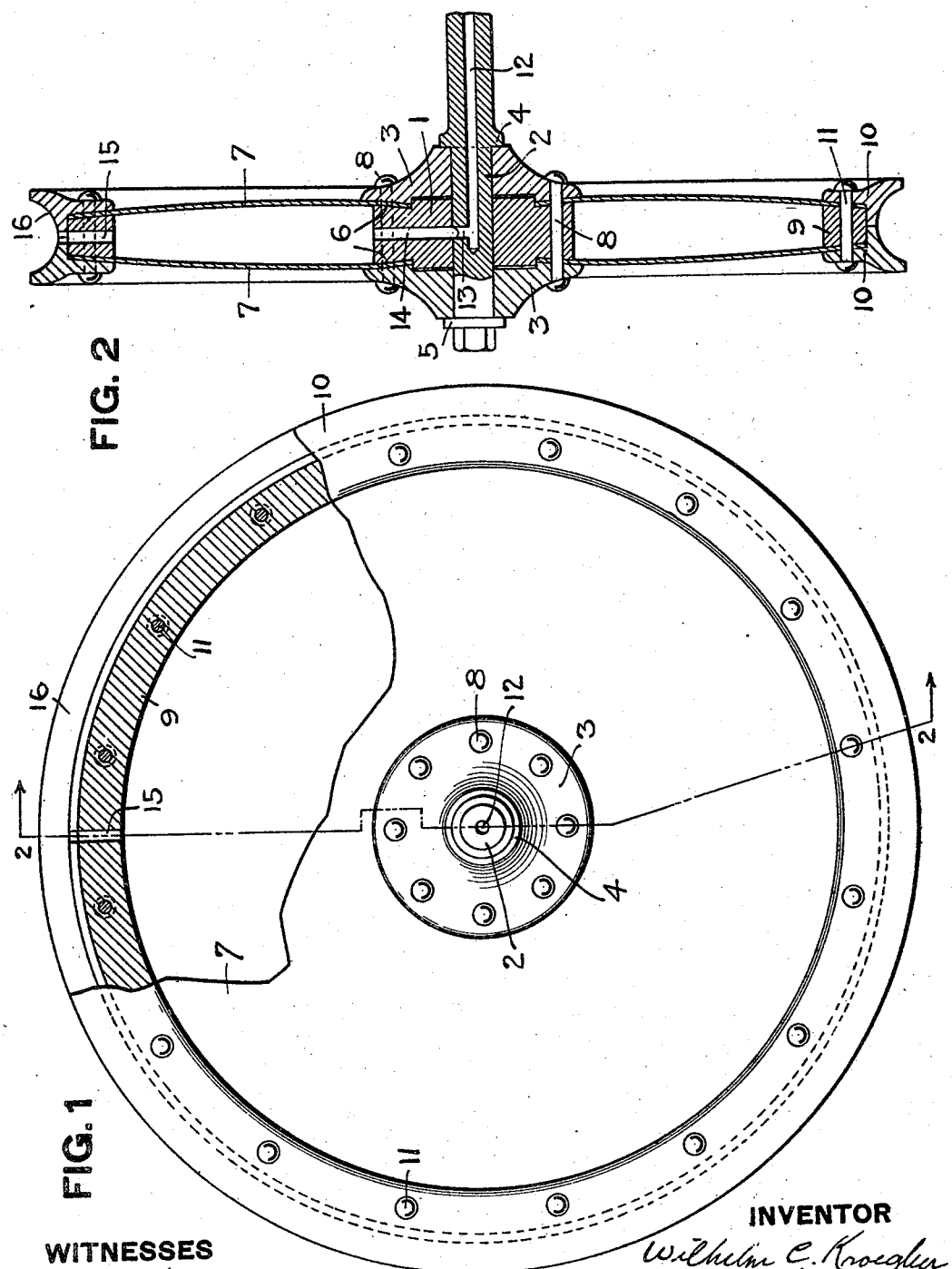
WITNESSES
J. R. Keller
Irene F. Geyer
INVENTOR
Wilhelm C. Kroegher
by Kay Totten & Powell
attys

UNITED STATES PATENT OFFICE.

WILHELM C. KROEGHER, OF BELLEVUE, PENNSYLVANIA; JOHN H. KROEGHER BEING ADMINISTRATOR OF SAID WILHELM (OR WILLIAM) C. KROEGHER, DECEASED.

VEHICLE WHEEL.

1,418,656.     Specification of Letters Patent.     Patented June 6, 1922.

Application filed August 21, 1915, Serial No. 46,609. Renewed April 20, 1922. Serial No. 555,693.

*To all whom it may concern:*

Be it known that I, WILHELM C. KROEGHER, a citizen of the United States, and resident of Bellevue, in the county of Allegheny and State of Pennsylvania, have invented a new and useful Improvement in Vehicle Wheels; and I do hereby declare the following to be a full, clear, and exact description thereof.

My invention relates to vehicle wheels, and is particularly concerned with a wheel, which is economical to manufacture, possesses great strength and great durability.

The invention comprises, in the main, a hub, a pair of annular plates secured to the hub, and a rim secured to the outer edges or peripheries of the annular plates; said plates form an air space between them into which air may be forced under pressure, and outlets may be provided in the rim to admit said air under a gum or other elastic tire to add to the resilient action thereof.

A preferred form of the invention is illustrated in the accompanying drawings, in which Fig. 1 is a side elevation partly in section, showing my improved wheel; Fig. 2 is a transverse section on the line 2—2, Fig. 1.

In the embodiment of my invention illustrated in the accompanying drawings, it will be seen that the wheel consists essentially of a hub, comprising a center member 1, which is apertured to be mounted upon an axle 2. Upon either side of the central hub member 1 are the outer hub members 3—3. The inner of the members 3 may abut against a shoulder or collar 4 on the axle, and the entire hub may be held firmly and rigidly on the axle by means of a nut and washer 5. The outer edge of the inner hub member 1 is rabbeted as at 6 to receive the annular web members 7—7, which form the web of the wheel. These web members or plates 7—7 are clamped in place on the central hub member by the outer hub members 3, and are held in position by means of rivets or other suitable fastening members 8. Between the outer edges of the web members 7—7 is mounted an inner web member 9, and the outer edges of the web members 7 are received between this inner member 9 and the outer rim members 10—10—all of said parts being fastened together by means of rivets or other fastenings 11.

It will be seen, therefore, that the wheel comprises a built-up hub having the web members or plates 7 secured between the members thereof and the built-up rim member between which the outer edges of the web members or plates 7 are secured. The web members are closed throughout their area and, consequently, offer no resistance to the passage of the wheel through mud, sand and the like, as in the case of spoked wheels. Moreover, this continuous character of the web member 7 forms an annular reservoir or cavity within the wheel into which air may be forced under pressure; for example, through a passage 12 in the axle, having an offset 13, which communicates with a passage 14 in the hub. Thus the interior may, if desired, be filled with air under pressure, which adds to the rigidity of the wheel. If desired, moreover, the rim of the wheel may be provided with a plurality of radial passages 15, which communicate with the groove 16 or other seat for the tire of the wheel. The tire may be of rubber or other suitable composition of any desired shape to fit within a corresponding shape of the rim. The air under pressure from within the wheel, presses against the under side or inner side of the tire, thus tending to expand the same, but, in effect, simply forming an additional cushion to prevent impact of the tread on the roadway.

In the broader aspect of the invention, it is to be noted that should a metal tire be used on the wheel, the invention has peculiar advantages for the reason that being entirely of metal, the expansion and contraction of the body of the wheel would correspond approximately and very closely to that of the tire, consequently, the tire would at all times be held firmly in place on the wheel. Where a metal tire is used, the rim, of course, may be of proper shape to receive the same. This is largely a matter of choice of the manufacturer or user.

While I have herein described a particular embodiment of my invention, it is to be understood that the same is not limited thereto, but may be altered in detail of construction and relative arrangement of parts within the scope of the appended claims.

What I claim is:

1. A wheel comprising a hub member, a rim member, a pair of annular plates mounted on said hub member and said rim member and spaced apart to form a hollow web for the wheel and means for introducing air under pressure into said web cavity of the wheel, a resilient tire having an inner face and means for permitting the air within the wheel to impinge against the inner face of said tire to add to the resiliency thereof.

2. A wheel comprising a hub member, a rim member, a pair of annular plates mounted on said hub member and said rim member and spaced apart to form a hollow web for the wheel, and means for introducing air under pressure into said web cavity of the wheel, a resilient tire having an inner face, and means for permitting the air within the wheel web to impinge against the inner face of said tire to expand the same uniformly around the circumference of the wheel.

In testimony whereof, I, the said WILHELM C. KROEGHER, have hereunto set my hand.

WILHELM C. KROEGHER.

Witnesses:
GARFIELD HOUSTON,
J. R. KELLER.